(12) United States Patent
Higuchi et al.

(10) Patent No.: US 12,146,755 B2
(45) Date of Patent: Nov. 19, 2024

(54) SYSTEMS AND METHODS FOR DETERMINING AND PROVIDING PARKING FACILITY ENTRANCE CHARACTERISTICS

(71) Applicant: Toyota Motor Engineering & Manufacturing North America, Inc., Plano, TX (US)

(72) Inventors: Takamasa Higuchi, Mountain View, CA (US); Kentaro Oguchi, Mountain View, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 281 days.

(21) Appl. No.: 17/868,915

(22) Filed: Jul. 20, 2022

(65) Prior Publication Data

US 2024/0027213 A1   Jan. 25, 2024

(51) Int. Cl.
  *G01C 21/34* (2006.01)
  *G01C 21/00* (2006.01)
  *G06V 20/58* (2022.01)

(52) U.S. Cl.
  CPC ...... *G01C 21/3476* (2013.01); *G01C 21/3811* (2020.08); *G01C 21/3841* (2020.08); *G06V 20/58* (2022.01)

(58) Field of Classification Search
  CPC ............ G01C 21/3476; G01C 21/3811; G01C 21/3841; G01C 21/3685; G01C 21/3819; G01C 21/165; G01C 21/1656; G01C 21/20; G06V 20/58; G06V 10/454; G06V 20/586; G06V 10/26; G06V 10/806; G06V 20/54; G08G 1/01; G08G 1/0969; G08G 1/14; H04L 67/10; H04L 67/12
  See application file for complete search history.

(56) References Cited

U.S. PATENT DOCUMENTS

| | | | |
|---|---|---|---|
| 8,368,558 B2 | 2/2013 | Nagase | |
| 9,250,079 B2 | 2/2016 | Zhou | |
| 9,704,392 B2 | 7/2017 | Wang | |
| 9,704,401 B2 | 7/2017 | Akavaram et al. | |
| 10,150,412 B2 | 12/2018 | Nallapa et al. | |
| 10,663,304 B2 * | 5/2020 | Wege | G05D 1/0274 |
| 10,789,844 B1 | 9/2020 | Whikehart | |
| 10,969,229 B2 * | 4/2021 | Akiva | G01C 21/3848 |
| 11,081,004 B1 | 8/2021 | Higuchi et al. | |

(Continued)

FOREIGN PATENT DOCUMENTS

| | | |
|---|---|---|
| KR | 102179864 B1 | 11/2020 |
| KR | 20210072213 A | 6/2021 |

*Primary Examiner* — Richard M Camby

(74) *Attorney, Agent, or Firm* — Christopher G. Darrow; Darrow Mustafa PC

(57) ABSTRACT

Systems, methods, and other embodiments described herein relate to improving locating favorable entrances. In one embodiment, a method includes acquiring sensor data about a parking facility entrance from at least one vehicle sensor, processing the sensor data into characteristics about the parking facility entrance, storing the characteristics about the parking facility entrance in a map that includes a location of the parking facility entrance, and providing a recommendation for a parking facility based, at least in part, on the map.

18 Claims, 7 Drawing Sheets

(56) References Cited

U.S. PATENT DOCUMENTS

2015/0344028 A1* 12/2015 Gieseke .............. B60W 30/095
                                                        348/148
2016/0117925 A1   4/2016 Akavaram et al.
2017/0010120 A1* 1/2017 Shashua ............... G05D 1/0212
2018/0335781 A1  11/2018 Chase et al.

* cited by examiner

SYSTEMS AND METHODS FOR DETERMINING AND PROVIDING PARKING FACILITY ENTRANCE CHARACTERISTICS

TECHNICAL FIELD

The subject matter described herein relates, in general, to identifying attributes about parking facility entrances and, more particularly, to suggesting parking facilities with entrances that include attributes matching criteria of a requestor.

BACKGROUND

When a driver attempts to find parking near a destination, the driver may decide to park at a parking facility based on vacancy, the location of the parking facility, the price to park at the parking facility, and so on. While these factors may be important in deciding where to park, the vehicle may face unavoidable difficulties when attempting to enter the parking facility due to the nature of the parking facility entrance. For example, an entrance may be too narrow for a vehicle to enter, include speed bumps, include steep ramps, be obstructed by an obstacle, have low clearance, or include other attributes that may result in difficulties entering the parking facility. Driving through unfavorable entries can cause damage to an undercarriage of a vehicle (e.g., if the vehicle is forced to drive over a curb or through a pothole when entering a parking facility), cause vehicles to make uncomfortable maneuvers (e.g., attempt to fit into narrow spaces by driving unnaturally slow through an entrance), cause the driver to panic, etc. Further, by the time the driver realizes that a parking facility entrance is unfavorable, the vehicle may not be able to back out of the parking facility due to traffic or other factors. As a result, vehicles may be forced to drive through unfavorable parking facility entrances since it is not possible to judge the nature of parking facility entrances before vehicles begin to enter the parking facility entrance.

SUMMARY

In one embodiment, example systems and methods relate to a manner of improving identification of parking facility entrances with attributes that facilitate ingress/egress of a vehicle. As previously noted, it is difficult to avoid unfavorable parking entrances because discerning the attributes of a parking facility entrance before entering the parking facility is difficult, at which time it may be too late to adapt navigation and find a new location to park. Accordingly, vehicles often encounter parking facility entrances with unfavorable characteristics, such as narrow entries, bumpy entries, entries with steep ramps, entries with obstacles, etc., once the vehicle has arrived at a parking facility. Driving through these unfavorable entrances may result in damage to the vehicle or leave drivers feeling panicked.

Therefore, in one embodiment, a system prioritizes locating and providing parking facilities with favorable entrances to improve the parking experience of vehicles. In one aspect, the system acquires sensor data about a parking facility entrance. For example, sensors of a vehicle, such as an inertial measurement unit (IMU), camera, radar, light detecting and ranging (LiDAR) sensor, global positioning system sensor (GPS), etc., may collect data. The system further identifies a parking facility entrance as the vehicle passes a parking facility entrance, for example, or as the vehicle enters a parking facility and correlates the sensor data with the entrance.

In one approach, the system processes the sensor data about the parking facility entrance into characteristics about the entrance. The system can process the sensor data by extracting characteristics about the entrance from the sensor data. For example, the system may determine that an unfavorable characteristic (e.g., a bump, steep ramp, narrow entry, obstacle, etc.) is present at an entrance if IMU data from the time at which the vehicle entered a parking facility indicates that the vehicle slowed down or stopped at the entrance, that the steering angle of the vehicle suddenly changed at the entrance, that the tilting angle of the vehicle suddenly changed at the entrance, and/or that spikes in accelerometer readings were present at the entrance. Additionally, or instead of processing IMU data to determine characteristics of entrances, the system may process image, radar, and/or LiDAR data to identify features of an entrance indicative of unfavorable characteristics. For example, the system may process image data to identify specific structures at an entrance, such as a bump, narrow entry, steep ramp, obstacle, etc. In any case, the system processes available vehicle sensor data to determine characteristics about a parking facility entrance.

The system, or at least an instance thereof is, in one embodiment, included directly in the vehicle that captured the sensor data. In one configuration, the sensor data is processed into characteristics about an entrance, where the characteristics about the entrance are sent to a cloud-computing environment. Alternatively, the system for processing the sensor data may be included in the cloud-computing environment external to the vehicle. In one approach, where the system is part of the cloud-computing environment, the system receives sensor data about entrances from multiple reporting vehicles and processes the sensor data received from each of the reporting vehicles into characteristics about entrances as described previously.

In any case, when the system receives information relating to characteristics about a parking facility entrance, the system stores the characteristics in a map that indicates the characteristics of parking facility entrances at respective locations. If the system receives characteristics about a parking facility entrance from more than one reporting vehicle, the system aggregates the characteristics in the map.

In one configuration, the system provides a recommendation for a parking facility based, at least in part, on the map. The system, in one approach, provides the recommendation in response to receiving a parking request from a requesting vehicle. For example, the system may recommend that a requesting vehicle park at a parking facility because the map shows no unfavorable characteristics pertaining to the parking facility entrance (i.e., no bumps, ramps, narrow entries, obstacles, etc. at the parking facility entrance). In one approach, the system provides a parking prioritization for a plurality of parking facilities based, at least in part, on unfavorable characteristics about entrances of the plurality of parking facilities. Accordingly, the system may prioritize parking facilities with the least amount of unfavorable characteristics when providing a recommendation.

In one arrangement, the system provides a recommendation based on characteristics about a requesting vehicle. For example, if the requesting vehicle is large, the system recommends parking facilities that do not have narrow entrances. The system may also provide a recommendation according to user preferences about characteristics of parking facility entrances. Accordingly, if a requesting vehicle indicates that a user would like to avoid driving over bumps when entering a parking facility, the system recommends parking facilities with no bumps. In this way, the disclosed system uses characteristics about parking facility entrances to improve locating parking facilities with favorable entrances.

In one embodiment, a system is disclosed. The parking system includes one or more processors and a memory communicably coupled to the one or more processors. The memory includes instructions that when executed by the one or more processors cause the one or more processors to acquire sensor data about a parking facility entrance from at least one vehicle sensor, process the sensor data into characteristics about the parking facility entrance, store the characteristics about the parking facility entrance in a map that includes the location of the parking facility entrance, and provide a recommendation for a parking facility based, at least in part, on the map.

In one embodiment, a non-transitory computer-readable medium that includes instructions that when executed by one or more processors cause the one or more processors to perform one or more functions is disclosed. The instructions include instructions to acquire sensor data about a parking facility entrance from at least one vehicle sensor, process the sensor data into characteristics about the parking facility entrance, store the characteristics about the parking facility entrance in a map that includes the location of the parking facility entrance, and provide a recommendation for a parking facility based, at least in part, on the map.

In one embodiment, a method is disclosed. In one embodiment, the method includes acquiring sensor data about a parking facility entrance from at least one vehicle sensor, processing the sensor data into characteristics about the parking facility entrance, storing the characteristics about the parking facility entrance in a map that includes a location of the parking facility entrance, and providing a recommendation for a parking facility based, at least in part, on the map.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
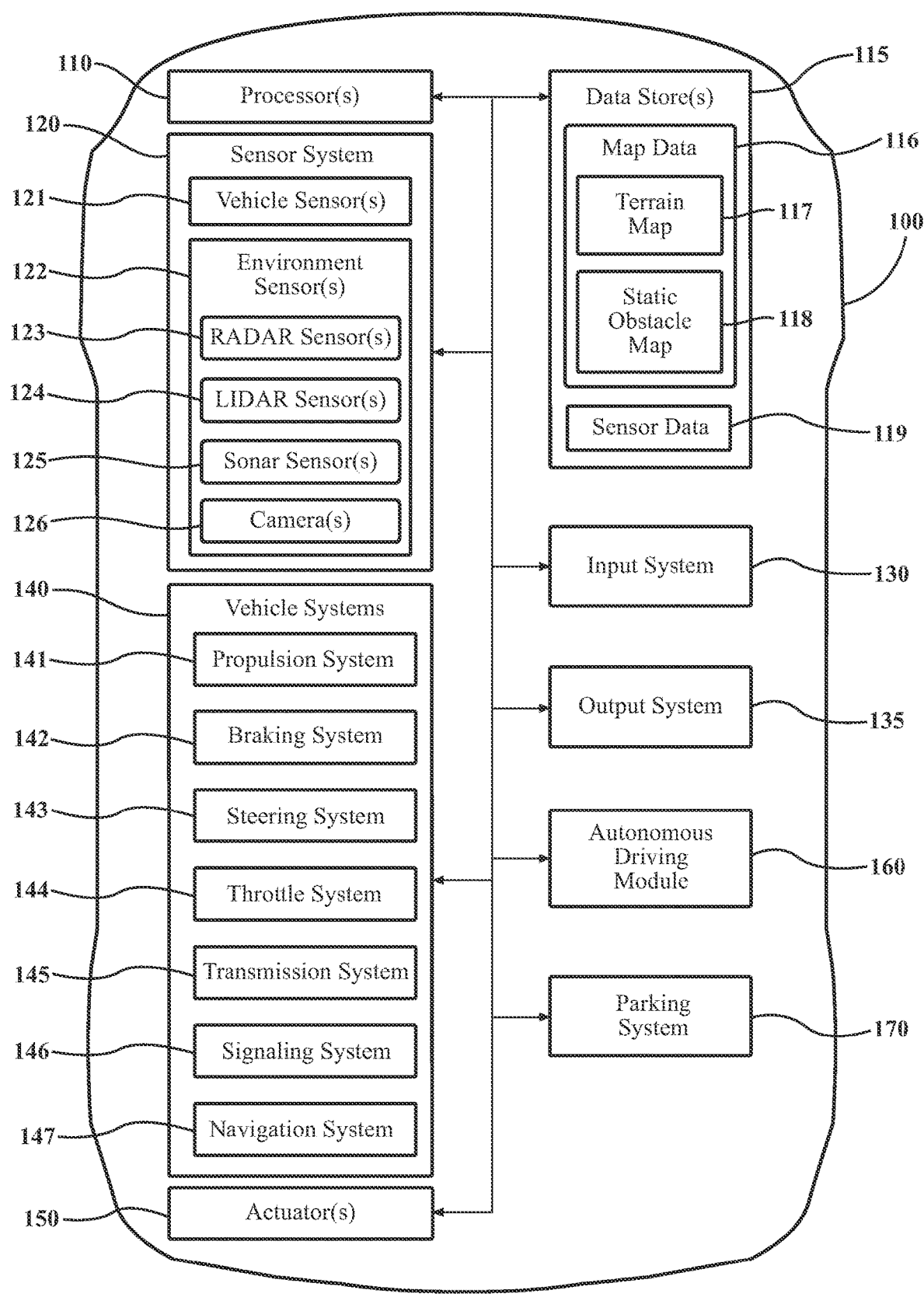
FIG. 1 illustrates one embodiment of a vehicle within which systems and methods disclosed herein may be implemented.

Systems, methods, and other embodiments associated with recommending parking facilities that have favorable entrances are disclosed herein. It is difficult to discern the nature of a parking facility entrance until a vehicle begins entering the parking facility. By the time an unfavorable entrance is discovered, vehicles may already be waiting to enter the facility, making it difficult to adapt navigation and locate a new parking facility. Accordingly, vehicles are often forced to drive through parking facility entrances with unfavorable characteristics, such as narrow entries, bumpy entries, entries with steep ramps, entries with obstacles, etc., to park. Driving through these unfavorable entrances leaves a vehicle vulnerable to damage and may impose panic in a driver.

Therefore, in one embodiment, a system that recommends parking facilities with favorable entrances to improve the parking experience of vehicles is disclosed. The system acquires sensor data about a parking facility entrance from at least one vehicle sensor. In one arrangement, in response to identifying an entrance, the system acquires sensor data using, for example, cameras, radars, light detecting and ranging sensors (LiDARs), etc. In addition to or instead of acquiring sensor data in response to identifying an entrance, the system may acquire sensor data when the vehicle enters a parking facility using, for example, an inertial measurement unit (IMU). In one embodiment, IMU data includes data, such as the acceleration of the vehicle, the speed of the vehicle, the steering angle of the vehicle, and the tilting angle of the vehicle as the vehicle enters the parking facility.

In one approach, the system processes the sensor data about the entrance into characteristics about the entrance by extracting characteristics about the entrance from the sensor data. The system, in one configuration, determines that an unfavorable characteristic (e.g., a bump, steep ramp, narrow entry, obstacle, etc.) is present at an entrance if IMU data from the time at which the vehicle entered a parking facility indicates the presence of the unfavorable entrance. For example, if the IMU data indicates that the vehicle slowed down or stopped at the entrance, it is likely that the entrance was narrow, included a bump, included a steep ramp, and/or included an obstacle as a vehicle would likely slow down due to the presence of any of these characteristics. If the IMU data indicates that the vehicle experienced a sudden change in the steering angle of the vehicle at the entrance, it is likely that the vehicle swerved to avoid an obstacle when entering the parking facility. If the IMU data indicates that the tilting angle of the vehicle suddenly changed at the parking facility entrance and/or that spikes in accelerometer readings were present at the parking facility entrance, it is likely that the vehicle encountered a bump or steep ramp at the entrance. In any case, the system can extract characteristics about the parking facility entrance based on the IMU data collected by a vehicle.

Further, the system may process image, radar, and/or LiDAR data to identify features of an entrance indicative of characteristics, including favorable and unfavorable. In one embodiment, the system acquires sensor data about an entrance when the system identifies an entrance from the sensor data as the vehicle travels. The system may identify an entrance by analyzing sensor data, such as image data, LiDAR data, and radar data acquired by the vehicle during a trip. When the system identifies an entrance from the sensor data, the system analyzes the sensor data about the entrance to extract features about the entrance. For example, the system may process image data to identify specific structures at an entrance, such as a bump, narrow entry, steep ramp, obstacle, etc. In any case, the system processes available vehicle sensor data to determine characteristics about an entrance.

The system, in one embodiment, captures the sensor data and locally processes the sensor data within the vehicle. In one approach, the system processes the sensor data into characteristics about an entrance, where the characteristics about the entrance are sent to a cloud-computing environment for storage. In one configuration, the system for processing the sensor data is included in the cloud-computing environment, where the system receives sensor data about parking facility entrances from one or more reporting vehicles and processes the sensor data into characteristics about entrances as described previously. Moreover, in one embodiment, users may manually report unfavorable parking facility characteristics to the system using, for example, a mobile device.

In any case, when the system receives information relating to characteristics about an entrance, the system stores the characteristics in a map that indicates the characteristics of entrances at respective locations of parking facilities or other data structure that relates the characteristics to the location of the entrance. If the system receives characteristics about an entrance from more than one source, the system aggregates the characteristics in the map. In one arrangement, the system validates the presence of entrance characteristics by aggregating the characteristics. For example, if a reporting vehicle communicates that a parking facility entrance includes a bump, the system validates the presence of the bump by receiving a report of the bump from a second reporting vehicle. Accordingly, in response to validating the bump, the system controls the map to show that a bump exists at the parking facility entrance. Further, in one configuration, the map shows that the bump has been validated by a second vehicle. In one approach, aggregating the characteristics includes combining reports of entrance characteristics from multiple sources. For example, if a first reporting vehicle communicates that a bump exists at an entrance, and a second reporting vehicle communicates that a narrow entry exists at the same entrance, the map shows that both a bump and narrow entry exists at the entrance.

In one configuration, the system provides a recommendation for a parking facility based, at least in part, on the map. The system, in one approach, provides the recommendation in response to receiving a parking request from a requesting vehicle. The parking request includes, for example, a desired location of a parking facility, a desired cost of parking at a parking facility, a desired size of parking spaces at the parking facility, and other parameters that affect the decision to park at a parking facility. In one arrangement, the system recommends that a requesting vehicle park at a parking facility because the map shows no unfavorable characteristics pertaining to the parking facility entrance (i.e., no bumps, ramps, narrow entries, obstacles, etc. at the parking facility entrance). In one approach, the system provides a parking prioritization for a plurality of parking facilities based, at least in part, on unfavorable characteristics about entrances of the plurality of parking facilities.

For example, if a requesting vehicle requests a parking recommendation within a radius of the final destination, and three parking facilities are present within the radius, the system prioritizes the recommendation to park at each of the parking facilities according to the number and presence of unfavorable characteristics. As one example, if the first entrance includes no unfavorable characteristics, the second entrance includes one unfavorable characteristic, and the third entrance includes three unfavorable characteristics, the system recommends that the requesting vehicle attempt to park at the first parking facility first, followed by the second, and finally the third. In this way, the system reduces the likelihood of a requesting vehicle parking at an unfavorable parking facility by prioritizing parking facilities with the least amount of unfavorable entrance characteristics.

In one arrangement, the system provides a recommendation based on characteristics about a requesting vehicle. For example, if the requesting vehicle is large, the system recommends parking facilities that do not have entrances too narrow for the vehicle to fit. If the vehicle has a low frame, the system recommends parking facility entrances that do not include bumps capable of damaging the vehicle's undercarriage. In one embodiment, the system provides a recommendation according to user preferences about characteristics of parking facility entrances. The system may include a user profile corresponding to user-specific parking facility entrance criteria. The user profile, in one arrangement, includes characteristics about parking facility entrances that a particular user prefers to avoid. The parking facility entrance criteria of the user may be set manually by the user, where the user indicates characteristics about parking facility entrances that the user wants to avoid using a human machine interface (HMI) of the vehicle. Alternatively, the parking facility entrance criteria of the user may be determined over time according to sensor data indicative of the user's preferences. For example, if the user reverses out of a parking facility when encountering a bump or steep ramp, the system updates the user profile to indicate that the user wishes to avoid bumps at future parking facilities. Accordingly, if a user profile indicates that a user would like to avoid driving over bumps when entering a parking facility, the system recommends parking facilities with no bumps. In this way, the disclosed system uses characteristics about parking facility entrances to improve locating parking facilities with favorable entrances.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes sensors to perceive aspects of the surrounding environment, and thus benefits from the functionality discussed herein associated with identifying parking facility entrance characteristics.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-10 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a parking system 170 that is implemented to perform methods and other functions as disclosed herein relating to recommending parking facilities with favorable entrances.

As will be discussed in greater detail subsequently, the parking system 170, in various embodiments, is implemented partially within the vehicle 100, and as a cloud-based service. For example, in one approach, functionality associated with at least one module of the parking system 170 is implemented within the vehicle 100 while further functionality is implemented within a cloud-based computing system. For example, a vehicle-side instance of the parking system 170 may acquire and report data about parking entrances, while a cloud-based instance may aggregate the information and service requests.

Figure 2:
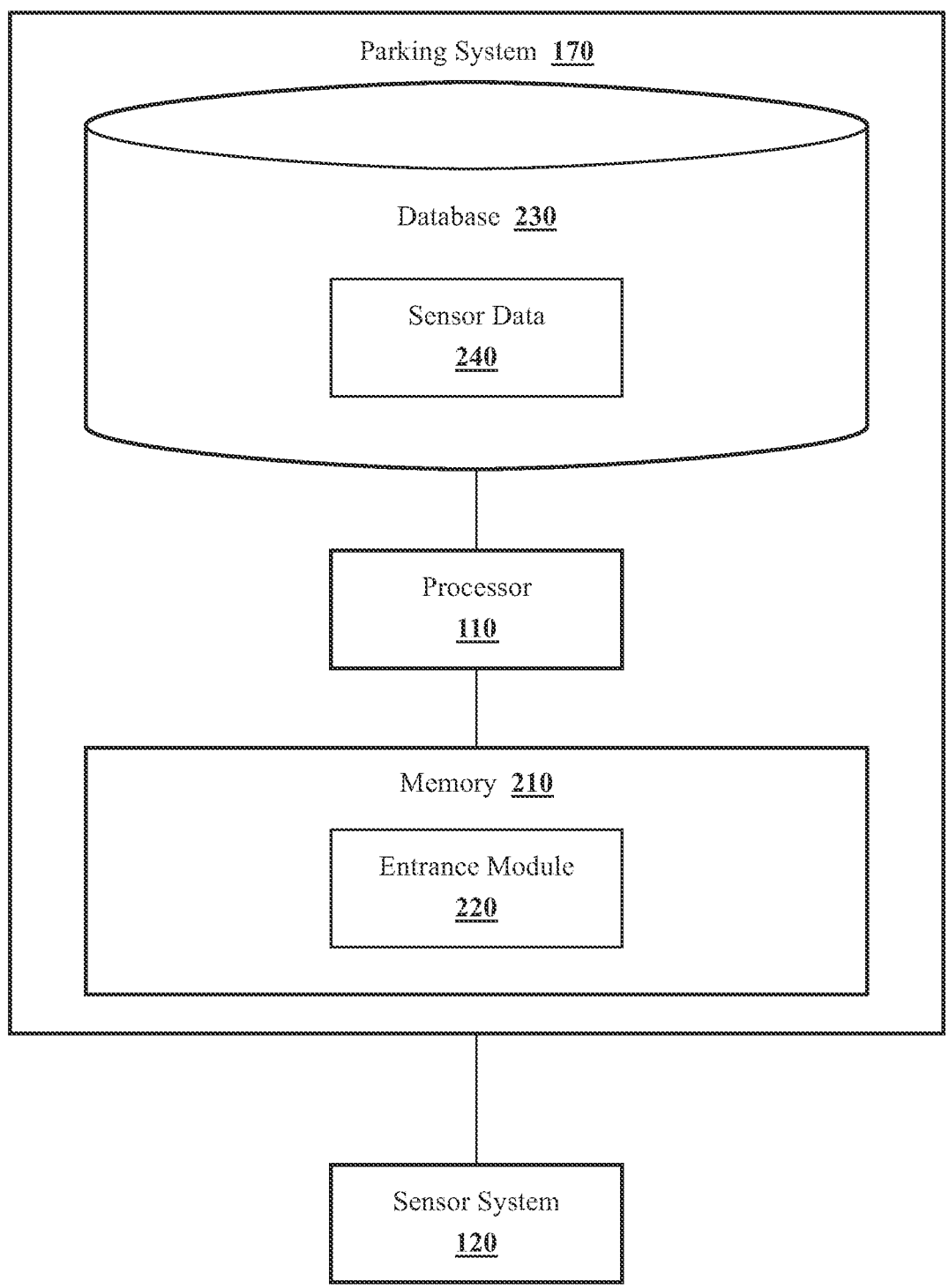
FIG. 2 illustrates one embodiment of a parking system that is associated with providing parking facilities that have favorable parking facility entrances to users

With reference to FIG. 2, one embodiment of the parking system 170 of FIG. 1 is further illustrated. The parking system 170 is shown as including a processor 110 from the vehicle 100 of FIG. 1. Accordingly, the processor 110 may be a part of the parking system 170, the parking system 170 may include a separate processor from the processor 110 of the vehicle 100, or the parking system 170 may access the processor 110 through a data bus or another communication path. In one embodiment, the parking system 170 includes a memory 210 that stores an entrance module 220. The memory 210 is a random-access memory (RAM), read-only memory (ROM), a hard-disk drive, a flash memory, or other suitable memory for storing the modules 220 and 230. The module 220 is, for example, computer-readable instructions that when executed by the processor 110 cause the processor 110 to perform the various functions disclosed herein.

Figure 3:
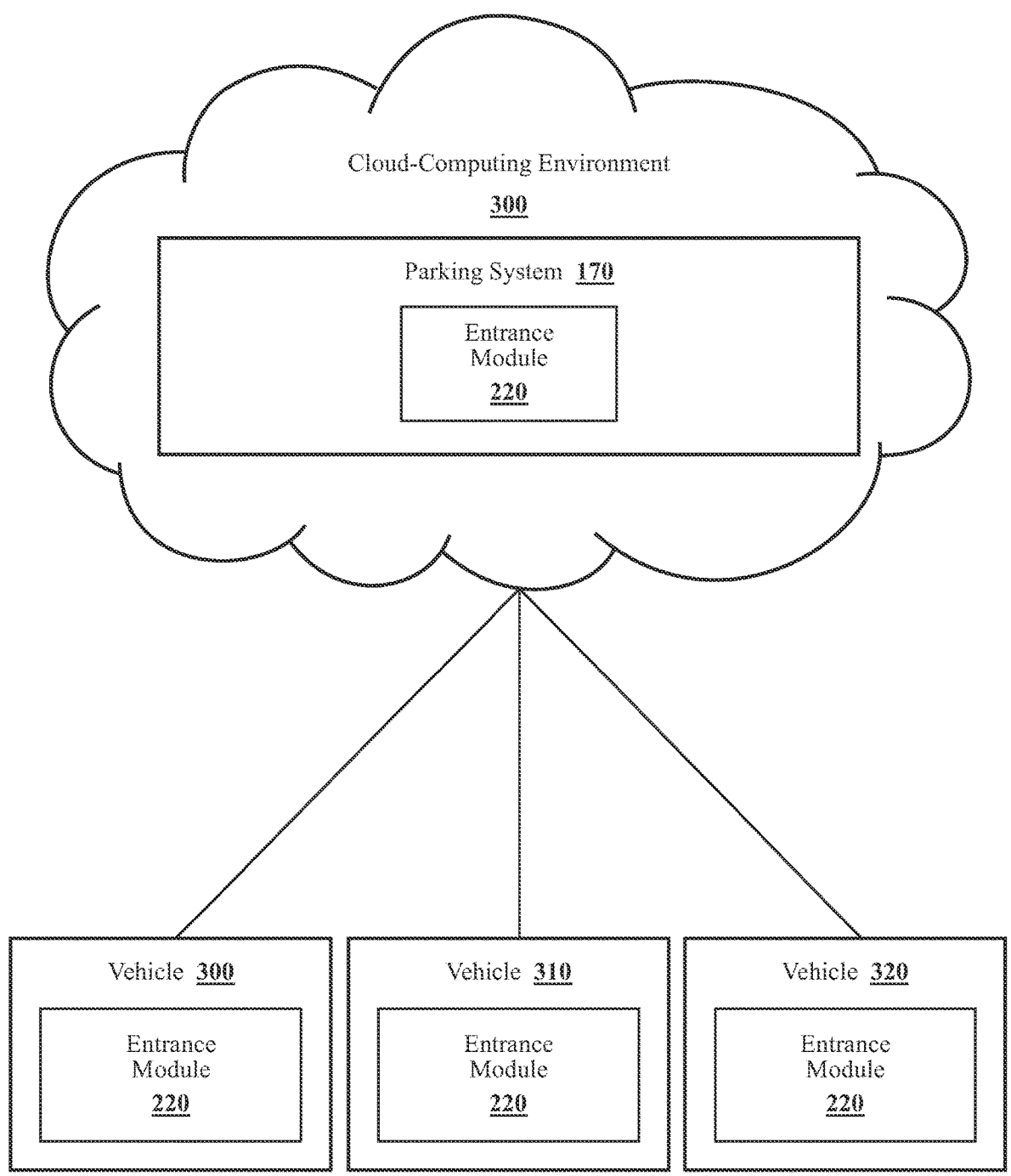
FIG. 3 illustrates one embodiment of the parking system of FIG. 2 in a cloud-computing environment.

The parking system 170 as illustrated in FIG. 2 is generally an abstracted form of the parking system 170 as may be implemented between the vehicle 100 and a cloud-computing environment. FIG. 3 illustrates one example of a cloud-computing environment 300 that may be implemented along with the parking system 170. As illustrated in FIG. 3, the parking system 170 is embodied at least in part within the cloud-computing environment 300 and also within the respective reporting vehicles 310, 320, and 330. That is, the cloud-computing environment 300 and vehicles 310, 320, and 330 each include the entrance module 220 or at least a portion thereof. Thus, the entrance module 220 is generally implemented within both aspects of the system 170 in order to provide for handling of the electronic data that includes the observations.

Moreover, the vehicles 310, 320, and 330 generally represent reporting vehicles that are equipped with sensors to identify characteristics of parking facility entrances. That is, the vehicles 310, 320, and 330 are, for example, vehicles similar to the vehicle 100. The noted vehicles may be autonomous, semi-autonomous, equipped with advanced driving assistance systems (ADAS), or another arrangement that generally includes sensors capable of perceiving parking facility entrances within a surrounding environment such that relative locations and characteristics of the entrances can be generated from the sensor data. Additionally, while three vehicles are illustrated, it should be appreciated that as a general matter the number of vehicles is not limited but instead includes any number of vehicles that are equipped in the noted manner and provide reports about the location and characteristics of parking facility entrances.

With continued reference to FIG. 2, the entrance module 220 generally includes instructions that function to control the processor 110 to receive data inputs from one or more sensors of the vehicle 100. The inputs are, in one embodiment, observations of parking facility entrances in an environment proximate to the vehicle 100 and/or other aspects about the surroundings. As provided for herein, the entrance module 220, in one embodiment, acquires sensor data 240 that includes at least camera images. In further arrangements, the entrance module 220 acquires the sensor data 240 from further sensors such as a radar 123, a LiDAR 124, an inertial measurement unit (IMU), a GPS, and other sensors as may be suitable for identifying attributes about parking facility entrances.

Accordingly, the entrance module 220, in one embodiment, controls the respective sensors to provide the data inputs in the form of the sensor data 240. Additionally, while the entrance module 220 is discussed as controlling the various sensors to provide the sensor data 240, in one or more embodiments, the entrance module 220 can employ other techniques to acquire the sensor data 240 that are either active or passive. For example, the entrance module 220 may passively sniff the sensor data 240 from a stream of electronic information provided by the various sensors to further components within the vehicle 100. Moreover, the entrance module 220 can undertake various approaches to fuse data from multiple sensors when providing the sensor data 240 and/or from sensor data acquired over a wireless communication link. Thus, the sensor data 240, in one embodiment, represents a combination of perceptions acquired from multiple sensors.

In addition to attributes that correspond to parking facility entrances, the sensor data 240 may also include, for example, information about characteristics associated with parking facility entrances, such as the presence of bumps, ramps, narrow entries, obstacles and so on. Moreover, the entrance module 220, in one embodiment, controls the sensors to acquire the sensor data 240 about an area that encompasses 360 degrees about the vehicle 100 in order to provide a comprehensive assessment of the parking facility entrance. Of course, in alternative embodiments, the entrance module 220 may acquire the sensor data about a forward direction alone when, for example, the vehicle 100 is not equipped with further sensors to include additional regions about the vehicle and/or the additional regions are not scanned due to other reasons.

In one approach, the entrance module 220 identifies a parking facility entrance from the sensor data 240. For example, the entrance module 220 may acquire the sensor data 240 as the vehicle 100 passes a parking facility. The sensor data 240 can include 3D point cloud data, camera images and/or video from the camera 126, radar measurements, and so on pertaining to the entrance. Accordingly, the entrance module 220, in one arrangement, identifies a parking facility entrance by extracting features indicative of a parking facility entrance, such as a gate, a sign denoting a parking facility (e.g., a sign that displays "parking"), a booth for receiving payments, and the like from the sensor data 240, In one configuration, the entrance module 220 acquires the sensor data 240 as the vehicle 100 enters a parking facility. The sensor data 240 may include IMU data, where the IMU data includes data, such as the acceleration of the vehicle 100, the speed of the vehicle 100, the steering angle of the vehicle 100, and the tilting angle of the vehicle 100 as the vehicle 100 enters the parking facility.

Moreover, in one embodiment, the parking system 170 includes a data store 230. In one embodiment, the data store 230 is a database. The database is, in one embodiment, an electronic data structure stored in the memory 210 or another data store and that is configured with routines that can be executed by the processor 110 for analyzing stored data, providing stored data, organizing stored data, and so on. Thus, in one embodiment, the data store 230 stores data used by the module 220 in executing various functions. In one embodiment, the data store 230 includes the sensor data 240 along with, for example, metadata that characterize various aspects of the sensor data 240. For example, the metadata can include location coordinates (e.g., longitude and latitude), relative map coordinates or tile identifiers, time/date stamps from when the separate sensor data 240 was generated, and so on. In one embodiment, the data store 230 further includes characteristic about parking facility entrances that are extracted from the sensor data 240, as generated by the entrance module 220. Moreover, in embodiments where the data store 230 is implemented as part of a cloud-computing environment, the data store 230 includes a map which stores the characteristics. Additionally, in configurations where the data store 230 is implemented as part of a cloud-computing environment, the sensor data 240 and characteristics include data aggregated from multiple separate reporting vehicles.

The entrance module 220, in one embodiment, is further configured to perform additional tasks beyond controlling the respective sensors to acquire and provide the sensor data 240. For example, the entrance module 220 includes instructions that cause the processor 110 to process the sensor data 240 into characteristics about a parking facility entrance.

In one approach, the entrance module 220 processes the sensor data 240 into characteristics about an entrance by identifying characteristics about the entrance within the sensor data 240. In one arrangement the entrance module 220 processes the sensor data 240 by using a machine learning algorithm embedded within the entrance module 220, such as a convolutional neural network (CNN), to perform semantic segmentation over the sensor data 240 from which the parking facility entrance is identified and extracted. Using the machine learning algorithm, the entrance module 220 provides an output with semantic labels identifying features about parking facility entrances represented in the sensor data 240. Accordingly, the entrance module 220 correlates identified features with characteristics about entrances. The characteristics include, for example, a width of the parking facility entrance, a slope of a ramp at the parking facility entrance, a presence of a bump at the parking facility entrance, and a presence of an obstacle at the parking facility entrance. In one arrangement, the entrance module 220 processes the sensor data 240 into characteristics by extracting features from acquired image, radar, LiDAR, and/or video data. For example, the system may process image data to identify specific structures at an entrance, such as a bump, narrow entry, steep ramp, obstacle, and so on.

The entrance module 220 may also process the sensor data 240 by extrapolating characteristics about an entrance from IMU data acquired as the vehicle 100 entered a parking facility. For example, if the IMU data indicates that the vehicle 100 slowed down or stopped at an entrance, it is likely that the entrance was narrow, included a bump, included a steep ramp, and/or included an obstacle as a vehicle would likely slow down due to the presence of any of these characteristics. If the IMU data indicates that the vehicle 100 experienced a sudden change in the steering angle of the vehicle 100 at an entrance, it is likely that the vehicle 100 swerved, and as such an obstacle is likely present at the entrance. If the IMU data indicates that the tilting angle of the vehicle 100 suddenly changed at an entrance and/or that large spikes in accelerometer readings were present at the entrance, it is likely that the vehicle 100 encountered a bump or steep ramp at the entrance.

Accordingly, after processing the sensor data 240 into characteristics about a parking facility entrance, the entrance module 220 communicates the characteristics to the cloud-computing environment 300 for storage. Alternatively, the entrance module 220 may receive the sensor data 240 from one or more reporting vehicles. That is, depending on capabilities of the vehicle 100 that implements an instance of the parking system 170, the entrance module 220 may process sensor data 240 at the vehicle 100 in an edge-based configuration or offload the sensor data 240 to the cloud-based environment for processing. In any case, the entrance module 220 processes the sensor data 240 into characteristics about parking facility entrances.

In one embodiment, in addition to receiving the sensor data 240 and characteristics about entrances from reporting vehicles, the cloud-computing environment 300 receives data associated with characteristics about parking facility entrances from mobile devices. For example, users with mobile devices may report characteristics about parking facility entrances they observe outside of a vehicle. In one arrangement, users send sensor data 240, such as image or video data associated with a parking facility entrance, to the cloud-computing environment 300 for processing of the sensor data 240.

In one arrangement, the entrance module 220 stores the characteristics about parking facility entrances in a map that includes the location of the parking facility entrance included in the cloud-computing environment 300. In one configuration, the entrance module 220 receives characteristics about a parking facility entrance from multiple sources, such as a plurality of reporting vehicles. Accordingly, in one embodiment, the entrance module 220 aggregates the characteristics about the parking facility entrance from the plurality of reporting vehicles in the map.

In one configuration, the entrance module 220 provides a recommendation based, at least in part, on the map. In one approach, the entrance module 220 provides a recommendation in response to receiving a parking request. A parking request may include the current location of the requestor (e.g., the current location of the vehicle 100), a final destination of the requestor, a desired distance from the final destination of the requestor to a parking facility, a desired cost of parking at a parking facility, a desired size of parking spaces at a parking facility, and so on. Accordingly, in one embodiment, the entrance module 220 provides a recommendation for a parking facility based on the criteria set forth in the parking request.

In one arrangement, the entrance module 220 provides a recommendation based on characteristics about a requesting vehicle. Characteristics about the requesting vehicle include, for example, a height, a width, a length or wheelbase, and a ground clearance. For example, if the requesting vehicle is six feet tall, six feet wide, and has seven inches of ground clearance, the entrance module 220 provides a recommendation to park at a parking facility with an entrance that is at least taller than six feet, at least wider than six feet, and without bumps or steep ramps that would cause damage to the undercarriage of the vehicle 100, as indicated by the ground clearance in addition to a buffer height (e.g., an additional six inches added to the height of the ground clearance) that allows the vehicle to travel over the bump and/or steep ramp.

In one approach, the entrance module 220 provides a recommendation based on user preferences regarding parking facility entrances. In one configuration, the data store 230 stores a user profile for a user, where the user profile includes preferences about parking facility entrances. For example, preferences about entrances may include that an entrance does not include a bump, a steep ramp, an obstacle, or an entrance narrower than six feet. The preferences of the user may be set manually by the user, where the user indicates characteristics about parking facility entrances that the user prefers to avoid on a human machine interface (HMI), such as a touchscreen display, located within the vehicle 100 or using a mobile device. Alternatively, the preferences of the user may be determined over time according to sensor data 240 indicative of the user's preferences. For example, if the user historically reverses out of a parking facility when encountering a bump or steep ramp, the system updates the user profile to indicate that the user prefers to avoid bumps and steep ramps in parking facility entrances. Accordingly, if a user profile indicates that a user would like to avoid driving over bumps and steep ramps when entering a parking facility, the entrance module 220 recommends parking facilities with no bumps or steep ramps.

In one embodiment, the entrance module 220 provides a recommendation for parking prioritization of a plurality of parking facilities based, at least in part, on unfavorable characteristics about entrances of the plurality of parking facilities. For example, if the entrance module 220 identifies several parking facilities that meet a requestor's parameters (e.g., the parking facilities are all within a threshold distance of the final destination of the requestor, the parking facilities all cost the same to park at, and the parking spaces at the parking facilities are of substantially similar dimensions), the entrance module 220 prioritizes which parking facility the requestor should park at based on the characteristics associated with the parking facilities. Unfavorable characteristics include, for example, the presence of a bump at an entrance, the presence of a steep ramp at an entrance, the presence of a narrow entry at an entrance, the presence of an obstacle at an entrance, and other characteristics that deter vehicles from entering a parking facility.

If, for example, the entrance module 220 identifies three parking facilities that meet a requestor's criteria, the entrance module 220 prioritizes which facilities the requestor should park at according to the characteristics of the three facilities. If the first facility entrance has no unfavorable characteristics, the second facility entrance has one unfavorable characteristic, and the third facility entrance has two unfavorable characteristics, the entrance module 220 provides a recommendation that prioritizes parking at the first facility, then the second facility, and finally the third facility. Further, where the characteristics about the requesting vehicle and user preferences are known, the entrance module 220 prioritizes parking facilities that include entrances capable of accommodating the characteristics of the requesting vehicle and the preferences of the user. If more than one parking facility has the same amount of unfavorable characteristics, the entrance module 220 prioritizes the parking facility that is, for example, closest to the final destination, cheapest, the most spacious, etc. In this way, the parking system 170 improves identification of accessible parking through recommending parking facilities with favorable entrances.

Figure 4:
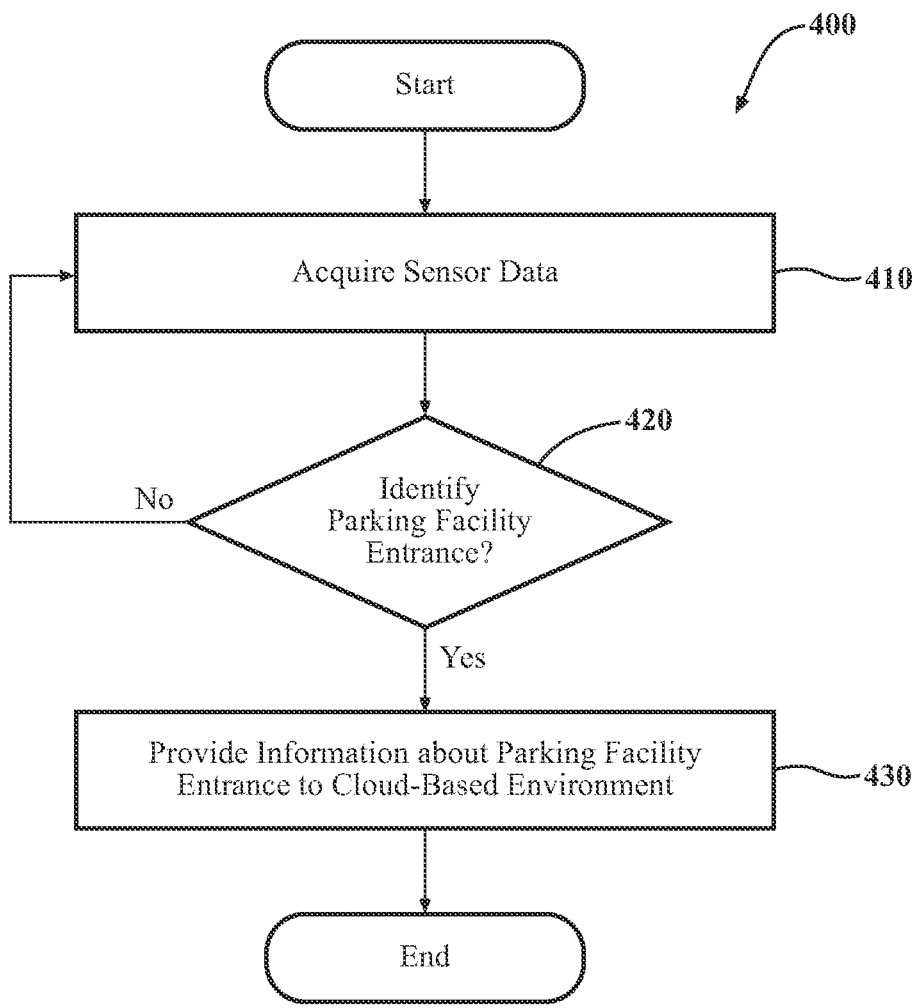
FIG. 4 illustrates one embodiment of a method that is associated with acquiring sensor data about a parking facility entrance.

Additional aspects of acquiring the sensor data 240 will be discussed in relation to FIG. 4. FIG. 4 illustrates a flowchart of a method 400 that is associated with acquiring sensor data about a parking facility entrance. Method 400 will be discussed from the perspective of the parking system 170 of FIGS. 1, 2 and 3. While method 400 is discussed in combination with the parking system 170, it should be appreciated that the method 400 is not limited to being implemented within the parking system 170 but is instead one example of a system that may implement the method 400.

At 410, the entrance module 220 acquires the sensor data 240. In one embodiment, the entrance module 220 controls the sensors to acquire radar data, image data, video data, LiDAR data, location data, and so on associated with parking facility entrances when the entrance module 220 identifies a parking facility entrance. As part of controlling the sensors to acquire the sensor data 240, it is generally understood that the sensors acquire the sensor data 240 of a region around the ego vehicle 100 with data acquired from different types of sensors generally overlapping in order to provide for a comprehensive sampling of the surrounding environment at each time step. The sensor data 240 of the region around the ego vehicle could include data related to characteristics of parking facility entrances in the environment of the ego vehicle 100 or data related to the ego vehicle 100 itself. In general, the sensor data 240 need not be of the exact same bounded region in the surrounding environment but should include a sufficient area of overlap such that distinct aspects of the area can be correlated. Thus, the entrance module 220, in one embodiment, controls the sensors to acquire the sensor data 240 of the surrounding environment.

Further, in one or more arrangements, the entrance module 220 acquires the sensor data 240 in response to the ego vehicle 100 entering a parking facility. In one configuration, the entrance module 220 controls the IMU to acquire the sensor data 240. Moreover, the entrance module 220 may control a GPS sensor to acquire location data, where the location data corresponds to locations of parking facilities. Accordingly, when the entrance module 220 identifies and/or enters a parking facility, the entrance module controls the sensors to acquire location data about the parking facility.

Moreover, in further embodiments, the entrance module 220 acquires the sensor data 240 at successive iterations or time steps. Thus, the parking system 170, in one embodiment, iteratively executes the functions discussed at block 410 to acquire the sensor data 240 and provide information therefrom. Additionally, as previously noted, the entrance module 220, when acquiring data from multiple sensors, fuses the data together to form the sensor data 240 and to provide for improved determinations of detection, location, and so on.

At 420, the entrance module 220 analyzes the sensor data 240 to identify a parking facility entrance from the sensor data 240. In one approach, the entrance module 220 identifies entrances by extracting features from acquired image, radar, LiDAR, and/or video data. In various approaches, the entrance module 220 employs different object recognition techniques to identify the entrance. The particular technique employed to identify the entrance may depend on available sensors within the vehicle 100, computational abilities (e.g., processor power) of the vehicle 100, and so on.

In one approach, the entrance module 220 uses a machine learning algorithm embedded within the entrance module 220, such as a convolutional neural network (CNN), to perform semantic segmentation over the sensor data 240 from which the parking facility entrances are identified and extracted. Of course, in further aspects, the entrance module 220 may employ different machine learning algorithms or implements different approaches for performing the semantic segmentation which can include deep convolutional encoder-decoder architectures, a multi-scale context aggregation approach using dilated convolutions, or another suitable approach that generates semantic labels for the separate object classes represented in the image. Whichever particular approach the entrance module 220 implements, the entrance module 220 provides an output with semantic labels identifying characteristics about parking facility entrances represented in the sensor data 240. In this way, the parking system 170 distinguishes between parking facility entrances and boundaries between the entrances.

In one approach, the entrance module 220 may process image data to identify specific structures indicative of a parking facility entrance, such as a gate, a sign denoting a parking facility (e.g., a sign that displays "parking"), a booth for receiving payments, and the like. In one arrangement, the entrance module 220 identifies entrances by analyzing the location and IMU data of the vehicle 100. For example, the entrance module 220 can identify an entrance if the IMU data reflects that the vehicle 100 slowed down or stopped at a location (i.e., a location that is identified by the GPS) that corresponds to a parking facility. In any case, if the entrance module 220 identifies a parking facility entrance, the entrance module 220 provides the information about the parking facility entrance to the cloud-based environment 300. Otherwise, the entrance module 220 acquires the sensor data 240 as discussed at block 410.

At 430, the entrance module provides information about the parking facility entrance to the cloud-based environment 300. Information about the parking facility entrance may include the sensor data 240 associated with the entrance and/or characteristics about the parking facility entrance which are derived from the entrance module 220 processing the sensor data 240. The entrance module 220 processes the sensor data 240, in one embodiment, into characteristics about the parking facility entrance by extracting characteristics about the entrance from the sensor data 240. For example, as will be discussed further in reference to FIG. 5, the entrance module 220 processes the sensor data 240 about the entrance into characteristics by extracting and correlating features associated with the entrance from image, video, and/or radar data and/or by extracting features associated with the entrance from the IMU data.

Figure 5:
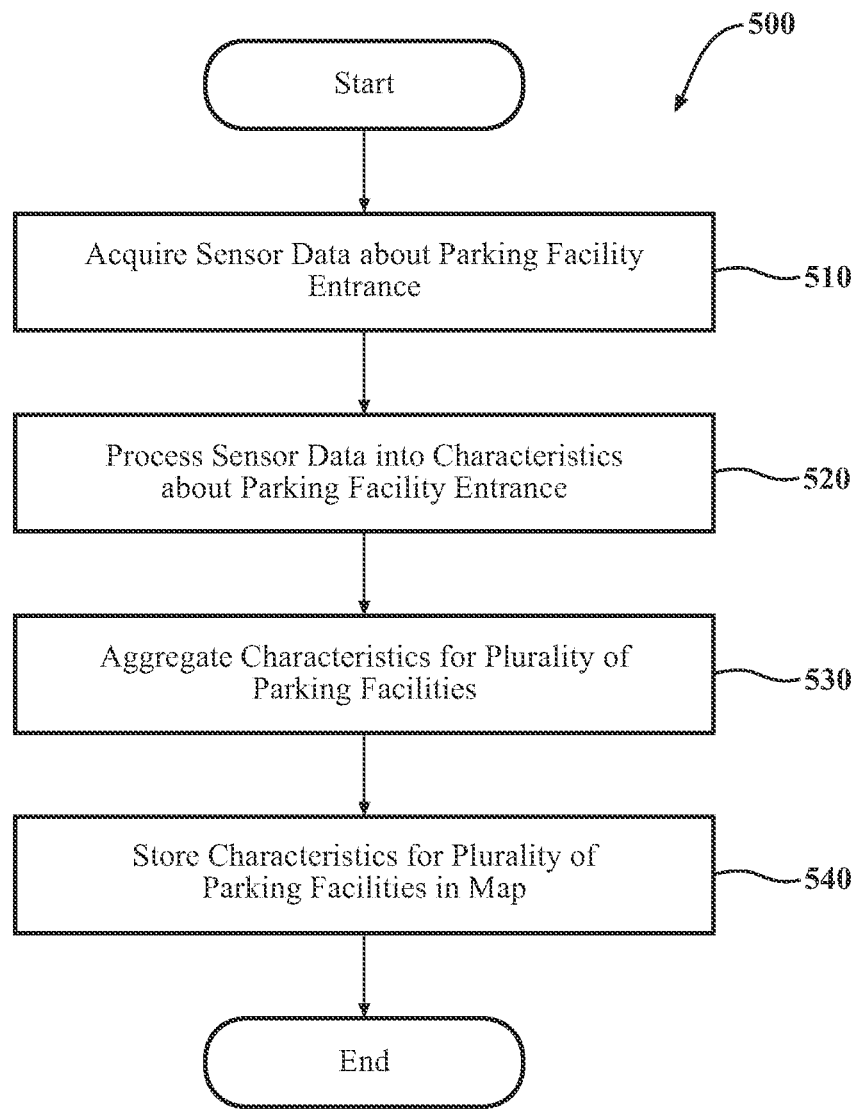
FIG. 5 illustrates one embodiment of a method that is associated with processing and storing characteristics about a parking facility entrance in a map.

FIG. 5 illustrates a flowchart of a method 500 that is associated with processing and storing characteristics about a parking facility entrance. Method 500 will be discussed from the perspective of the parking system 170 of FIGS. 1, 2 and 3. While method 500 is discussed in combination with the parking system 170, it should be appreciated that the method 500 is not limited to being implemented within the parking system 170 but is instead one example of a system that may implement the method 500.

At 510, the entrance module 220 acquires the sensor data 240 about a parking facility entrance. As previously discussed, the entrance module 220 acquires the sensor data 240 in response to the vehicle 100 identifying or entering a parking facility, where the sensor data 240 includes, for example, image data, video data, radar data, LiDAR data, location data, and IMU data.

At 520, the entrance module 220 processes the sensor data 240 into characteristics about the parking facility entrance. As previously discussed, the entrance module 220, in one approach, use a machine learning algorithm to process the sensor data 240. In one embodiment, where the sensor data 240 is image data, video data, radar, data, and/or LiDAR data, the entrance module 220 processes the sensor data 240 by extracting features of parking facility entrance characteristics from the data. For example, the entrance module 220 may identify a bump, narrow entrance, steep ramp, or obstacle from the sensor data 240. Accordingly, if the entrance module 220 identifies features associated with a characteristic about the parking facility entrance from the sensor data 240, the entrance module 220 processes the sensor data 240 into the characteristic about the entrance.

In one arrangement, where the sensor data 240 is IMU data, the entrance module 220 processes the sensor data 240 into characteristics about a parking facility entrance by extrapolating features about an entrance from the way in which the reporting vehicle 100 enters a parking facility. For example, if the IMU data indicates that the vehicle 100 slowed down or stopped at an entrance, it is likely that the entrance was narrow, included a bump, included a steep ramp, and/or included an obstacle as the vehicle 100 would likely slow down due to the presence of any of these characteristics. If the IMU data indicates that the vehicle 100 experienced a sudden change in the steering angle of the vehicle 100 at an entrance, it is likely that the vehicle 100 swerved, and as such an obstacle is likely present at the entrance. For example, if the steering angle 100 indicates a sharp right turn at the entrance of the parking facility, there is likely an obstacle on the left side of the entrance that the vehicle 100 avoided. If the IMU data indicates that the tilting angle of the vehicle 100 suddenly changed at an entrance and/or that large spikes in accelerometer readings were present at the entrance, it is likely that the vehicle encountered a bump or steep ramp at the entrance. For example, the vehicle 100 will slow down at the initial onset of encountering a bump or steep ramp since the vehicle 100 would otherwise suffer from damage to the undercarriage of the vehicle 100 if the vehicle 100 did not stop or slow down when encountering a bump and/or steep ramp. Further, the vehicle 100 experiences spikes in accelerometer readings after initially driving over a bump or on to a steep ramp because at this point, the vehicle 100 must accelerate to safely drive over the bump or up the steep ramp. In any case, the entrance module 220 processes IMU data into characteristics about parking facility entrances by determining scenarios that correspond to the acquired IMU data.

In one or more embodiments, the entrance module 220 receives characteristics and/or processes the sensor data 240 into characteristics about a plurality of parking facility entrances from a plurality of reporting vehicles. At 530, the entrance module 220 aggregates the characteristics received from a plurality of reporting vehicles for a plurality of parking facilities. In one arrangement, the entrance module 220 validates the presence of entrance characteristics by aggregating the characteristics. For example, if a reporting vehicle communicates that an entrance includes a bump, the entrance module 220 validates the presence of the bump by receiving a report of the bump from a second reporting vehicle. In one approach, aggregating the characteristics includes combining reports of entrance characteristics from multiple sources. For example, if a first reporting vehicle communicates that a bump exists at an entrance, and a second reporting vehicle communicates that a narrow entry exists at the same entrance, the entrance module 220 aggregates the characteristics.

At 540, the entrance module 220 stores the aggregation of characteristics about the plurality of parking facilities in a map included in the cloud-computing environment 300. The map includes locations of parking facilities and characteristics of entrances at respective locations of parking facilities. Characteristics include, for example, a width of the parking facility entrance, a slope of a ramp at the parking facility entrance, a presence of a bump at the parking facility entrance, and a presence of an obstacle (e.g., a pothole, vehicle blocking the entrance, etc.) at the parking facility entrance In one arrangement, the map shows validations of characteristics about entrances. For example, if multiple reporting vehicles report a bump at a entrance, the map shows that the bump has been validated by multiple reporting vehicles. Conversely, if a bump has not been validated by a second reporting vehicle, the map may show that the bump has not been validated. Further, in one embodiment, the map shows multiple characteristics about an entrance according to the aggregated data. As an example, if one reporting vehicle reports a bump, and a second reporting vehicle reports a narrow entry, the map shows the presence of both the bump and the narrow entry.

Figure 6:
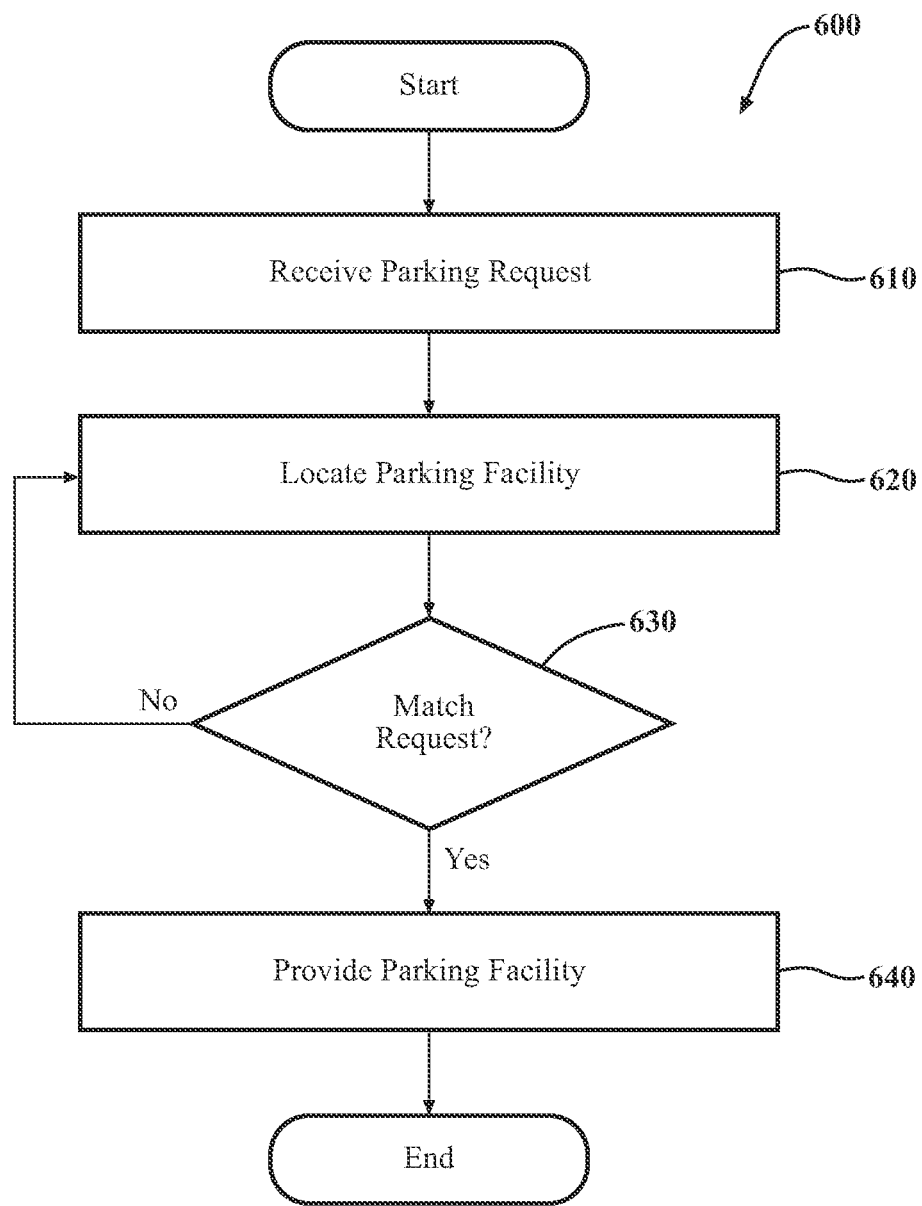
FIG. 6 illustrates one embodiment of a method that is associated with providing a recommendation for a parking facility.

FIG. 6 illustrates a flowchart of a method 600 that is associated with providing a recommendation for a parking facility. Method 600 will be discussed from the perspective of the parking system 170 of FIGS. 1, 2 and 3. While method 600 is discussed in combination with the parking system 170, it should be appreciated that the method 600 is not limited to being implemented within the parking system 170 but is instead one example of a system that may implement the method 600.

At 610, the entrance module 220 receives a parking request, where the parking request originates from, in one embodiment, the vehicle 100. In one approach, the parking request includes criteria corresponding to a parking facility, such as a price the requestor is willing to pay, a distance from a final destination the requestor want the parking facility to be within, dimensions of parking spaces within the parking facility, and so on. The parking request may further include characteristics about the requesting vehicle that affect the ability of the requesting vehicle 100 to enter a parking facility. Characteristics about the requesting vehicle 100 include, for example, the dimensions of the requesting vehicle (i.e., the width, height, and ground clearance of the requesting vehicle). In one embodiment, the entrance module 220 acquires the characteristics about the requesting vehicle 100 from the data store 230.

In one configuration, the parking request includes user preferences for a parking facility entrance. User preferences for entrances include, for example, entrances with no bumps, no narrow entries, no obstacles, and no steep ramps. User preferences associated with entrances are, in one embodiment, stored in a user profile associated with a user. In one arrangement, the data store 230 stores the user profile. The user profile includes characteristics about entrances that the user considers unfavorable. Unfavorable characteristics may be uploaded by a user using a human machine interface (HMI) within the requesting vehicle (e.g., the user uses a touchscreen device in the cabin of the vehicle to input unfavorable characteristics the user seeks to avoid at entrances). Alternatively, in one arrangement, the entrance module 220 acquires user preferences based on historical data associated with the user. For example, if the entrance module 220 determines that a user historically reverses out of parking facilities that have steep ramps, the entrance module 220 updates the user's user profile to indicate that the user prefers to avoid parking facility entrances with steep ramps.

At 620, the entrance module 220 locates a parking facility for the requesting vehicle using the map of the cloud-computing environment 300 to determine the characteristics about the parking facility entrance as well as the location of the parking facility. At 630, the entrance module 220 determines whether the parking facility matches the criteria of the parking request. If the parking facility matches the parking facility request, the entrance module 220 provides the parking facility as discussed at block 640. Otherwise, the entrance module 220 locates a different parking facility entrance as discussed at block 620.

At 640, the entrance module 220 provides a recommendation for a parking facility based, at least in part, on the map. For example, the entrance module 220 may provide a recommendation for a parking facility because the map indicates that the parking facility has no unfavorable characteristics. In one arrangement, the entrance module 220 provides the recommendation based on the characteristics of the requesting vehicle and the user preferences of the requesting vehicle. For example, if the characteristics of the requesting vehicle indicate that the vehicle requires a parking facility entrance that is wider than six feet, the entrance module 220 recommends a parking facility with an entrance that is wider than six feet, as indicated by the map. In one approach, the entrance module 220 provides the recommendation based on the user preferences of the requestor. For example, if the user preferences include that the user prefers parking facilities with no bumps, the entrance module 220 recommends a parking facility that does not include bumps, as indicated by the map.

In one embodiment, the entrance module 220 provides a prioritization for a plurality of parking facilities based, at least in part, on unfavorable characteristics about entrances of the plurality of parking facilities. Unfavorable characteristics include, for example, the presence of a bump at an entrance, the presence of a steep ramp at an entrance, the presence of a narrow entry at an entrance, the presence of an obstacle at an entrance, and other characteristics that deter vehicles from entering a parking facility. If, for example, the entrance module 220 identifies three parking facilities that meet a requestor's location, cost, and parking space dimension criteria, the entrance module 220 prioritizes which facilities the entrance module 220 recommends according to the characteristics of the three facilities. If the first facility entrance has no unfavorable characteristics, the second facility entrance has one unfavorable characteristic, and the third facility entrance has two unfavorable characteristics, the entrance module 220 provides a recommendation that prioritizes parking at the first facility, then the second facility, and finally the third facility.

Further, where the characteristics about the requesting vehicle and user preferences are known, the entrance module 220 prioritizes parking facilities that include entrances capable of accommodating the characteristics of the requesting vehicle and the preferences of the user. If more than one parking facility has the same number of unfavorable characteristics, the entrance module 220 prioritizes the parking facility that is, for example, closest to the final destination, cheapest, the most spacious, etc. In one arrangement, if a plurality of parking facilities include the same number of unfavorable characteristics, the entrance module 220 prioritizes the parking facility that does not have the user-specific unfavorable characteristic. For example, if a user prefers no bumps at an entrance, and the entrance module 220 identifies identical parking facilities in terms of location and cost but differing in that one of the facility entrances includes a bump and one of the facility entrances includes a steep ramp, the entrance module 220 prioritizes the parking facility with the steep ramp because the user prefers no bumps. In this way, the parking system improves locating and recommending parking facilities with favorable points of ingress/egress.

Figure 7:
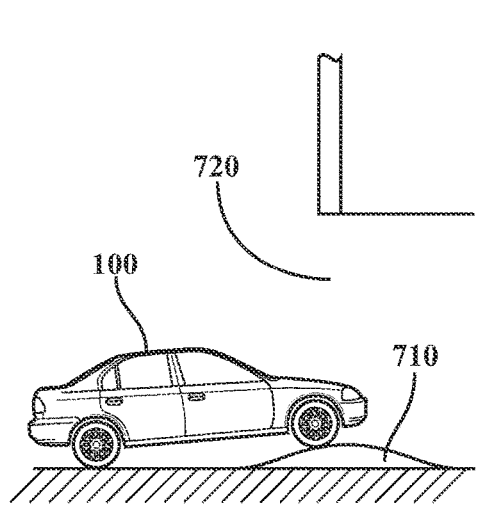
FIG. 7 illustrates one embodiment of a parking facility entrance with a bump.

Examples of unfavorable parking facility entrance characteristics will now be discussed in relation to FIGS. 7-10. FIGS. 7-10 will be discussed from the perspective of the vehicle 100 and parking system 170 of FIG. 1-3. FIG. 7 illustrates one embodiment of a parking facility entrance 720 with a bump 710. In one approach, the vehicle 100 acquires sensor data 240 about the parking facility entrance 720 when the entrance module 220 identifies the parking facility entrance 720 from the sensor data 240. Accordingly, the entrance module 220 processes the sensor data 240, such as image data, radar data, LiDAR data, video data, and the like, by extracting visual features about the parking facility entrance 720 to identify the bump 710. In one arrangement, if the vehicle 100 enters the parking facility, to traverse the bump 710, the vehicle 100 slows down before driving over the bump 710, tilts upward when driving over the bump 710, accelerates to drive over the bump 710, and tilts downward to finally overcome the bump 710. Accordingly, the vehicle 100 acquires IMU data corresponding to the actions of the vehicle 100 as the vehicle encounters, drives over, and overcomes the bump 710. The entrance module 220 processes the acquired IMU data into a characteristic about the entrance, where the characteristic about the entrance is the presence of the bump 710. In any case, the entrance module 220 stores an indication that the bump 710 exists at the parking facility entrance 720 in a map included in the cloud-computing environment 300 when the entrance module 220 processes the sensor data 240 to determine the presence of the bump 710.

Figure 8:
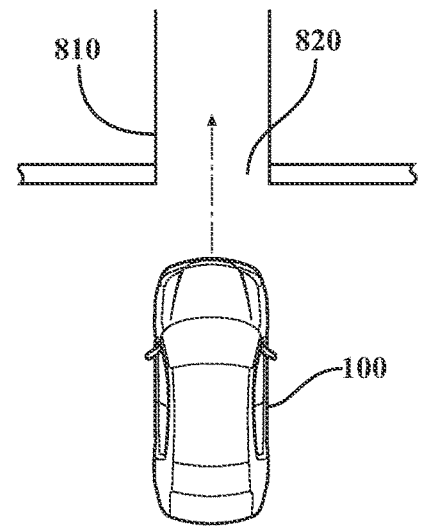
FIG. 8 illustrates one embodiment of a parking facility entrance with a narrow entry.

FIG. 8 illustrates one embodiment of a parking facility entrance 820 with a narrow entry 810. In one approach, the vehicle 100 acquires sensor data 240 about the parking facility entrance 820 when the entrance module 220 identifies the parking facility entrance 820 from the sensor data 240. Accordingly, the entrance module 220 processes the sensor data 240, such as image data, radar data, LiDAR data, video data, and the like, by extracting visual features about the parking facility entrance 820 to identify the narrow entry 810. The entrance module 220 determines, in one embodiment, that the narrow entry 810 is present if the entrance module 220 determines that the width of the entrance 820 satisfies a threshold width (e.g., less than six feet wide).

In one arrangement, if the vehicle 100 enters the parking facility 820, to avoid scratching the vehicle 100 or hitting the narrow entry 810, the vehicle 100 decelerates and slowly traverses through the narrow entry 810. Accordingly, the vehicle 100 acquires IMU data indicative of the vehicle 100 decelerating and slowly entering the narrow entry 810. The entrance module 220 processes the acquired IMU data into a characteristic about the entrance, where the characteristic about the entrance is the presence of the narrow entry 810. In any case, the entrance module 220 stores an indication that the narrow entry 810 exists at the parking facility entrance 820 in a map included in the cloud-computing environment 300 when the entrance module 220 processes the sensor data 240 to determine the presence of the narrow entry 810.

Figure 9:
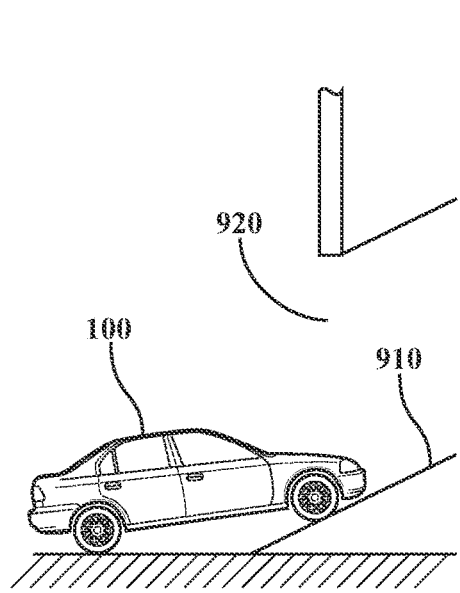
FIG. 9 illustrates one embodiment of a parking facility entrance with a steep ramp.

FIG. 9 illustrates one embodiment of a parking facility entrance 920 with a steep ramp 910. In one approach, the vehicle 100 acquires sensor data 240 about the parking facility entrance 920 when the entrance module 220 identifies the parking facility entrance 920 from the sensor data 240. Accordingly, the entrance module 220 processes the sensor data 240, such as image data, radar data, LiDAR data, video data, and the like, by extracting visual features about the parking facility entrance 920 to identify the steep ramp 910. In one arrangement, if the vehicle 100 enters the parking facility to drive over the steep ramp 910 without damaging the undercarriage of the vehicle 100, the vehicle 100 slows down before driving up the steep ramp 910, tilts upward when driving up the steep ramp 910, accelerates to drive up the steep ramp 910, and tilts downward to a level position when the vehicle 100 has successfully driven up the entirety of the steep ramp 910. Accordingly, the vehicle 100 acquires IMU data corresponding to the actions of the vehicle 100 as the vehicle approaches and drives up the steep ramp 910. The entrance module 220 processes the acquired IMU data into a characteristic about the entrance, where the characteristic about the entrance is the presence of the steep ramp 910. In any case, the entrance module 220 stores an indication that the steep ramp 910 exists at the parking facility entrance 920 in a map included in the cloud-computing environment 300 when the entrance module 220 processes the sensor data 240 to determine the presence of the steep ramp 910.

Figure 10:
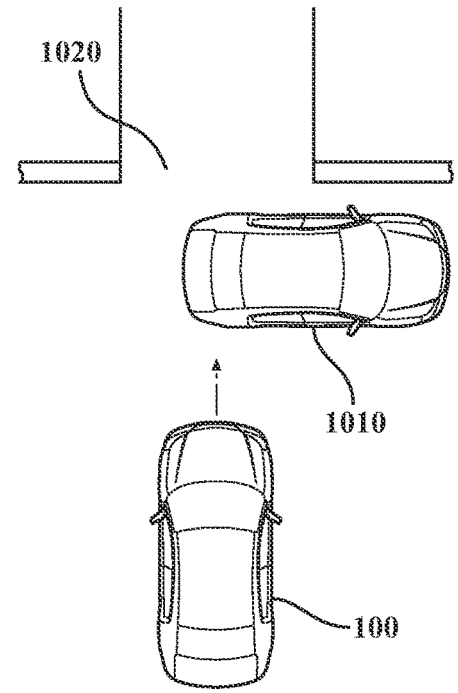
FIG. 10 illustrates one embodiment of a parking facility entrance with an obstacle obstructing the parking facility entrance

FIG. 10 illustrates one embodiment of a parking facility entrance 1020 with an obstacle 1010 obstructing the parking facility entrance 1020. In one approach, the vehicle 100 acquires sensor data 240 about the parking facility entrance 1020 when the entrance module 220 identifies the parking facility entrance 1020 from the sensor data 240. Accordingly, the entrance module 220 processes the sensor data 240, such as image data, radar data, LiDAR data, video data, and the like, by extracting visual features about the parking facility entrance 1020 to identify the obstacle 1010. As illustrated, the obstacle 1010 is a vehicle. However, it should be understood that the obstacle 1010 may be any object that obstructs the parking facility entrance 1020, such as a construction site, a pothole, and so on.

In one arrangement, to get around the obstacle 1010 as the vehicle 100 enters, the vehicle 100 adjusts the steering angle to swerve around the obstacle 1010. Accordingly, the entrance module 220 acquires IMU data corresponding to the actions of the vehicle 100 as the vehicle avoids the obstacle 1010. The entrance module 220 processes the acquired IMU data into a characteristic about the entrance, where the characteristic about the entrance is the presence of the obstacle 1010. The entrance module 220 may determine the location of the obstacle in relation to the parking facility entrance 1020 by analyzing the direction of the steering angle of the vehicle 100. For example if the vehicle 100 steers to the right to avoid the obstacle 1010, the entrance module 220 determines that the obstacle 1010 is on the left side of the parking facility entrance 1020. In any case, the entrance module 220 stores an indication that the obstacle 1010 exists at the parking facility entrance 1020 in a map included in the cloud-computing environment 300 when the entrance module 220 processes the sensor data 240 to determine the presence of the obstacle 1010.

Although FIGS. 7-10 include examples of unfavorable characteristics present at parking facility entrances, it should be understood that the examples of FIGS. 7-10 are not an exclusive list of unfavorable characteristics that may be identified by the entrance module 220. Any characteristic about an entrance that deters a vehicle from entering a parking facility is an unfavorable characteristic that the entrance module 220 can identify and store in the map of the cloud-computing environment 300. In this way, the parking system 170 improves identifying and recommending parking facilities with favorable entrances.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in only a subset of possible modes.

In one or more embodiments, the vehicle 100 is an autonomous vehicle. As used herein, "autonomous vehicle" refers to a vehicle that is capable of operating in an autonomous mode (e.g., category 5, full automation). "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), and application specific integrated circuit (ASIC), a microprocessor, etc. The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, and hard drives. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of each of the following: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the parking system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement of the vehicle 100. The processor(s) 110, the parking system 170, and/or the autonomous driving module(s) 160 may control some or all of the vehicle systems 140 and, thus, may be partially or fully autonomous as defined by SAE 0 to 5.

The processor(s) 110, the parking system 170, and/or the autonomous driving module(s) 160 can be operatively connected to communicate with the various vehicle systems 140 and/or individual components thereof. For example, returning to FIG. 1, the processor(s) 110, the parking system 170, and/or the autonomous driving module(s) 160 can be in communication to send and/or receive information from the various vehicle systems 140 to control the movement. of the vehicle 100. The processor(s) 110, the parking system 170, and/or the autonomous driving module(s) 160 may control some or all of the vehicle systems 140.

The processor(s) 110, the parking system 170, and/or the autonomous driving module(s) 160 may be operable to control the navigation and maneuvering of the vehicle 100 by controlling one or more of the vehicle systems 140 and/or components thereof. For instance, when operating in an autonomous mode, the processor(s) 110, the parking system 170, and/or the autonomous driving module(s) 160 can control the direction and/or speed of the vehicle 100. The processor(s) 110, the parking system 170, and/or the autonomous driving module(s) 160 can cause the vehicle 100 to accelerate, decelerate ( ) and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be element or combination of elements operable to alter one or more of the vehicle systems 140 or components thereof to responsive to receiving signals or other inputs from the processor(s) 110 and/or the autonomous driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the parking system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 240 as implemented by the occupancy module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-10, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for, comprising:
   one or more processors; and
   a memory communicably coupled to the one or more processors and storing instructions that, when executed by the one or more processors, cause the one or more processors to:
      acquire sensor data about a parking facility entrance from at least one vehicle sensor;
      process the sensor data into characteristics about the parking facility entrance;
      store the characteristics about the parking facility entrance in a map that includes a location of the parking facility entrance; and
      provide a recommendation for a parking facility based, at least in part, on the map and further based, at least in part, on one or more of characteristics about a requesting vehicle and user preferences regarding characteristics of parking facilities.

2. The system of claim 1, wherein the instructions to store the characteristics include instructions to aggregate the characteristics about the parking facility entrance from a plurality of reporting vehicles.

3. The system of claim 1, wherein the instructions to acquire the sensor data include instructions to acquire the sensor data in response to at least one of: identifying the parking facility entrance and entering the parking facility entrance.

4. The system of claim 1, wherein the instructions to process the sensor data into the characteristics include instructions to extract the characteristics about the parking facility entrance from the sensor data,
   wherein the characteristics about the parking facility entrance include at least one of: a width of the parking facility entrance, a slope of a ramp at the parking facility entrance, a presence of a bump at the parking facility entrance, and a presence of an obstacle at the parking facility entrance.

5. The system of claim 1, wherein the instructions to provide the recommendation include instructions to provide the recommendation in response to receiving a parking request.

6. The system of claim 1, wherein the instructions to provide the recommendation include instructions to provide a parking prioritization for a plurality of parking facilities based, at least in part, on unfavorable characteristics about entrances of the plurality of parking facilities.

7. The system of claim 1, wherein the instructions to process the sensor data include instructions to process the sensor data using a machine learning algorithm.

8. A non-transitory computer-readable medium including instructions that when executed by one or more processors cause the one or more processors to:
   acquire sensor data about a parking facility entrance from at least one vehicle sensor;
   process the sensor data into characteristics about the parking facility entrance;
   store the characteristics about the parking facility entrance in a map that includes a location of the parking facility entrance; and provide a recommendation for a parking facility based, at least in part, on the map and further based, at least in part, on one or more of characteristics about a requesting vehicle and user preferences regarding characteristics of parking facilities.

9. The non-transitory computer-readable medium of claim 8, wherein the instructions to store the characteristics about the parking facility entrance in the map include instructions to aggregate the characteristics about the parking facility entrance from a plurality of reporting vehicles.

10. The non-transitory computer-readable medium of claim 8, wherein the instructions to acquire the sensor data about the parking facility entrance include instructions to acquire the sensor data in response to at least one of: identifying the parking facility entrance and entering the parking facility entrance.

11. The non-transitory computer-readable medium of claim 8, wherein the instructions to process the sensor data into the characteristics include instructions to extract the characteristics about the parking facility entrance from the sensor data,
   wherein the characteristics about the parking facility entrance include at least one of: a width of the parking facility entrance, a slope of a ramp at the parking facility entrance, a presence of a bump at the parking facility entrance, and a presence of an obstacle at the parking facility entrance.

12. The non-transitory computer-readable medium of claim 8, wherein the instructions to provide the recommendation includes instructions to provide a parking prioritization for a plurality of parking facilities based, at least in part, on unfavorable characteristics about entrances of the plurality of parking facilities.

13. A method, comprising:
   acquiring sensor data about a parking facility entrance from at least one vehicle sensor;
   processing the sensor data into characteristics about the parking facility entrance;
   storing the characteristics about the parking facility entrance in a map that includes a location of the parking facility entrance; and
   providing a recommendation for a parking facility based, at least in part, on the map and further based on one or more of characteristics about a requesting vehicle and user preferences regarding characteristics of parking facilities.

14. The method of claim 13, wherein storing the characteristics about the parking facility entrance in the map includes aggregating the characteristics about the parking facility entrance from a plurality of reporting vehicles.

15. The method of claim 13, wherein acquiring the sensor data about the parking facility entrance includes acquiring the sensor data in response to at least one of: identifying the parking facility entrance and entering the parking facility entrance.

16. The method of claim 13, wherein processing the sensor data into characteristics about the parking facility entrance includes extracting the characteristics about the parking facility entrance from the sensor data,
   wherein the characteristics about the parking facility entrance include at least one of: a width of the parking facility entrance, a slope of a ramp at the parking facility entrance, a presence of a bump at the parking facility entrance, and a presence of an obstacle at the parking facility entrance.

17. The method of claim 13, wherein providing the recommendation includes providing the recommendation in response to receiving a parking request.

18. The method of claim 13, wherein providing the recommendation includes providing a parking prioritization for a plurality of parking facilities based, at least in part, on unfavorable characteristics about entrances of the plurality of parking facilities.

\* \* \* \* \*